(12) United States Patent
Jenni

(10) Patent No.: US 10,083,389 B2
(45) Date of Patent: *Sep. 25, 2018

(54) SIM CARD AND METHOD FOR PRODUCING SAME

(71) Applicant: Swisscom AG, Bern (CH)

(72) Inventor: Peter Jenni, Wabern (CH)

(73) Assignee: SWISSCOM AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,972

(22) Filed: May 30, 2017

(65) Prior Publication Data

US 2018/0018549 A1  Jan. 18, 2018

Related U.S. Application Data

(63) Continuation of application No. 13/780,894, filed on Feb. 28, 2013, now Pat. No. 9,665,819, which is a
(Continued)

(30) Foreign Application Priority Data

Aug. 31, 2010 (CH) ............................. 2010CH1406

(51) Int. Cl.
    *G06K 19/077*    (2006.01)
    *H01R 33/90*     (2006.01)

(52) U.S. Cl.
    CPC ..... *G06K 19/07739* (2013.01); *G06K 19/077* (2013.01); *H01R 33/90* (2013.01); *Y10T 29/49826* (2015.01)

(58) Field of Classification Search
    CPC ........... G06K 19/077; G06K 19/07732; G06K 19/07739; H01R 33/90
(Continued)

(56) References Cited

U.S. PATENT DOCUMENTS 5,936,227 A    8/1999  Trüggelmann et al.
6,320,751 B2  11/2001  Takeda et al.
(Continued)

FOREIGN PATENT DOCUMENTS

EP    0749095   6/1996
EP    1626365   2/2006
(Continued)

OTHER PUBLICATIONS

European Patent Office, Search Report in application No. PCT/EP2011/062928, dated Nov. 16, 2011.

*Primary Examiner* — Toan Ly
(74) *Attorney, Agent, or Firm* — McAndrews, Held & Malloy, Ltd.

(57) ABSTRACT

Methods and systems are provided for utilizing enhanced SIM cards with integrated SIM cards. An example SIM card may comprise an integrated SIM card that is smaller than the SIM card; with the SIM card comprising a plurality of punched cutouts adjacent to the integrated SIM card. The punched cutouts may be arranged such that the integrated SIM card can be detached from the SIM card. Each one of the punched cutouts may line up with at least one electrical contact of the integrated SIM card, and a width of each one of the punched cutouts may be set based on at least one dimension of the electrical contact of the integrated SIM card. The punched cutouts may be arranged based on a direction of insertion of the integrated SIM card. The SIM card may comprise engraved lines arranged based on the punched cutouts.

20 Claims, 2 Drawing Sheets

Figure 1:
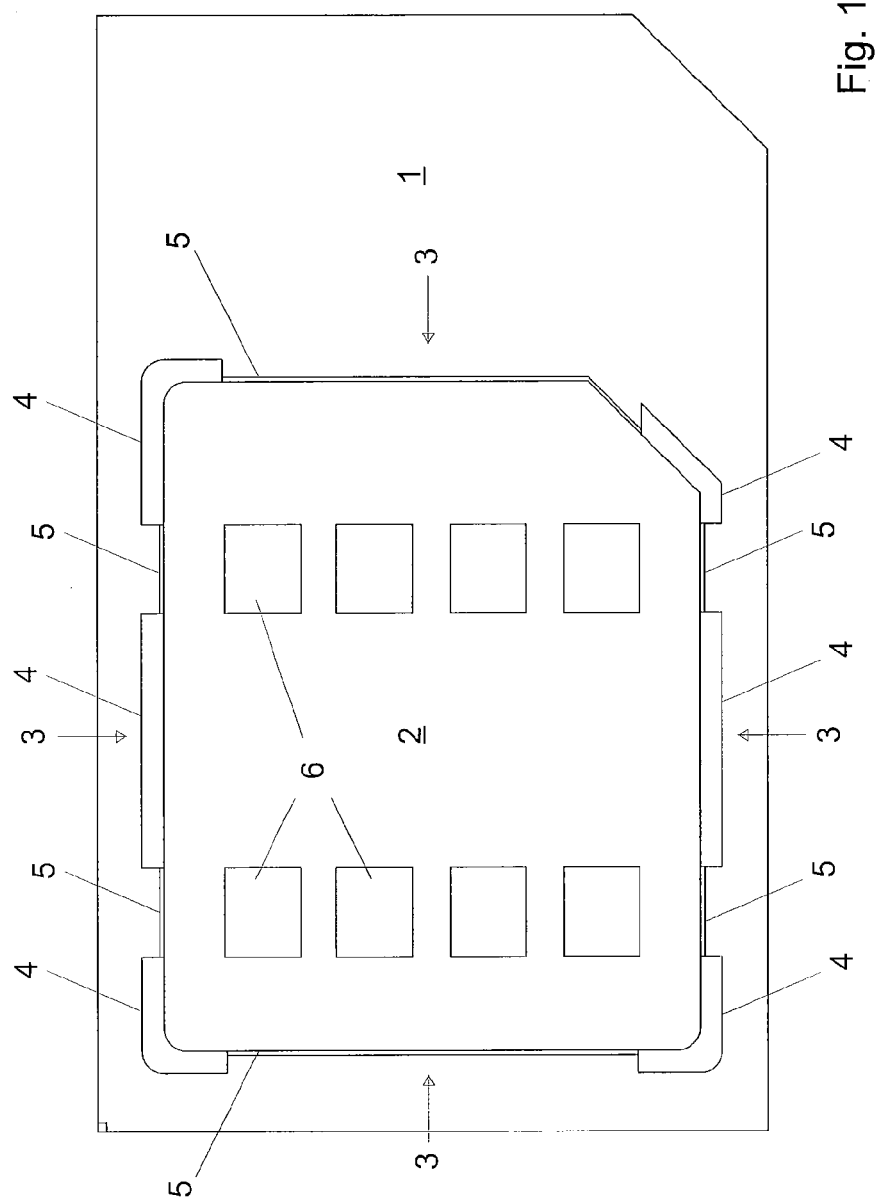

Related U.S. Application Data continuation of application No. PCT/EP2011/062928, filed on Jul. 27, 2011.

(58) Field of Classification Search
USPC .............................. 235/492; 439/638; 29/825
See application file for complete search history.

(56) References Cited

U.S. PATENT DOCUMENTS

| | | |
|---|---|---|
| 6,448,638 B1 | 9/2002 | Fidalgo et al. |
| 6,561,432 B1 | 5/2003 | Vedder et al. |
| 6,964,377 B1 | 11/2005 | Haghiri et al. |
| 2005/0231921 A1 | 10/2005 | Noda et al. |
| 2007/0270039 A1 | 11/2007 | Froger et al. |

FOREIGN PATENT DOCUMENTS

| | | |
|---|---|---|
| EP | 1626366 | 2/2006 |
| JP | 206309629 | 9/2006 |

SIM CARD AND METHOD FOR PRODUCING SAME

CLAIM OF PRIORITY

This patent application is a continuation of U.S. patent application Ser. No. 13/780,894 filed on Feb. 28, 2013, which in turn is a continuation of International (PCT) patent application Ser. No. PCT/EP2011/062928 filed on Jul. 27, 2011, which in turn claims priority from Swiss Patent Application No. 2010CH-1406 filed on Aug. 31, 2010. Each of above identified applications is hereby incorporated herein by reference in its entirety.

TECHNICAL FIELD

The invention relates to a SIM card in plug-in format according to the independent product claim and to a method for producing same.

STATE OF THE ART

SIM (Subscriber Identity Module) cards are used among others in GSM and UMTS mobile radio networks for identifying the mobile users. In this connection, different card formats have been defined. Older mobile devices or devices where the SIM card is to be exchanged often mostly use SIM cards in credit card format, the so-called ID-1 format. In the case of modern and smaller mobile devices, so-called plug-in SIM cards in the ID-000 format have become prevalent. Even smaller are the so-called mini UICC SIM cards that are used with increasing frequency in modern miniaturized mobile devices. These SIM card formats are specified among others in the GSM specification TS102 221 v9.1.0.

EP0521778 describes such a SIM card in plug-in format that is arranged in a larger SIM card in credit card format. The plug-in card is surrounded by punched cutouts and is only connected through some connecting points with the rest of the larger card. By pressing on the plug-in card, the latter can be separated from the larger card and thus used in a mobile device that only accepts SIM cards in plug-in format.

WO0043950 describes another data support carrier with a break-off chip card in plug-in format. Within the plug-in card, a further predetermined break line is provided to further reduce the size of the SIM card. With this solution, mobile radio network operators can distributed adaptable SIM cards to all their mobile users without having to pay heed to the type of used mobile device; the mobile user himself can adapt the card to the required size by appropriately separating connection bridges.

A similar solution is also described in WO2006069965, which describes different pre-cutout processes.

In order for the smaller card to be separated cleanly from the larger card, great care is required during the manufacture of the connection bridges. It is in particular necessary to ensure that these bridges can be broken resp. separated cleanly without undesired burrs or unclean tear-off edges remaining that could prevent the mobile device from being plugged-in or even damage the electrical contacts within the mobile device. It is just as important that the separation occurs exactly along the desired separation line, so that the separated card in plug-in or mini format has exactly the standardized size and format. In doing so, it is necessary to take care that these connection bridges are only broken if this is indeed desired and not done inadvertently, for example if the card is bent or otherwise manipulated.

These technical difficulties in the manufacture of the separable connection bridges have been solved to a large extent with various solutions in several patent documents. FR2773900, WO0017814, WO0016257, FR2806661, FR2819081 or WO0115077 all address at least partly this problem. Often, the predetermined break line through the connection point is, for example, marked on one or both sides with an engraved line that clearly reduces the risk of indentation.

This problem of unclean separation of connection bridges has meanwhile been solved so well that it no longer or hardly ever occurs in practice. Even a clumsy user can reliably separate the SIM card in plug-in format from the data carrier and subsequently also cleanly separate the card in mini format, without dangerous burrs occurring in the process.

REPRESENTATION OF THE INVENTION

It is thus an aim of the invention to solve the problem of burrs in cut-out SIM cards in mini format that are separated by the user.

It is in particular an aim of the invention that a SIM card in plug-in format with an integrated SIM card in mini format can be used in the slot (SIM card reader) of a mobile device without the contacts of the mobile device becoming damaged in the process. The aim also consists in being able to cleanly break off the SIM card in mini format out of the plug-in.

According to the invention, this aim is achieved with a SIM card having the characteristics of the independent device claim and with a method for producing same having the characteristics of the independent device claim.

Further advantageous embodiments are indicated in the dependent claims.

SHORT DESCRIPTION OF THE FIGURES

Figure 2:
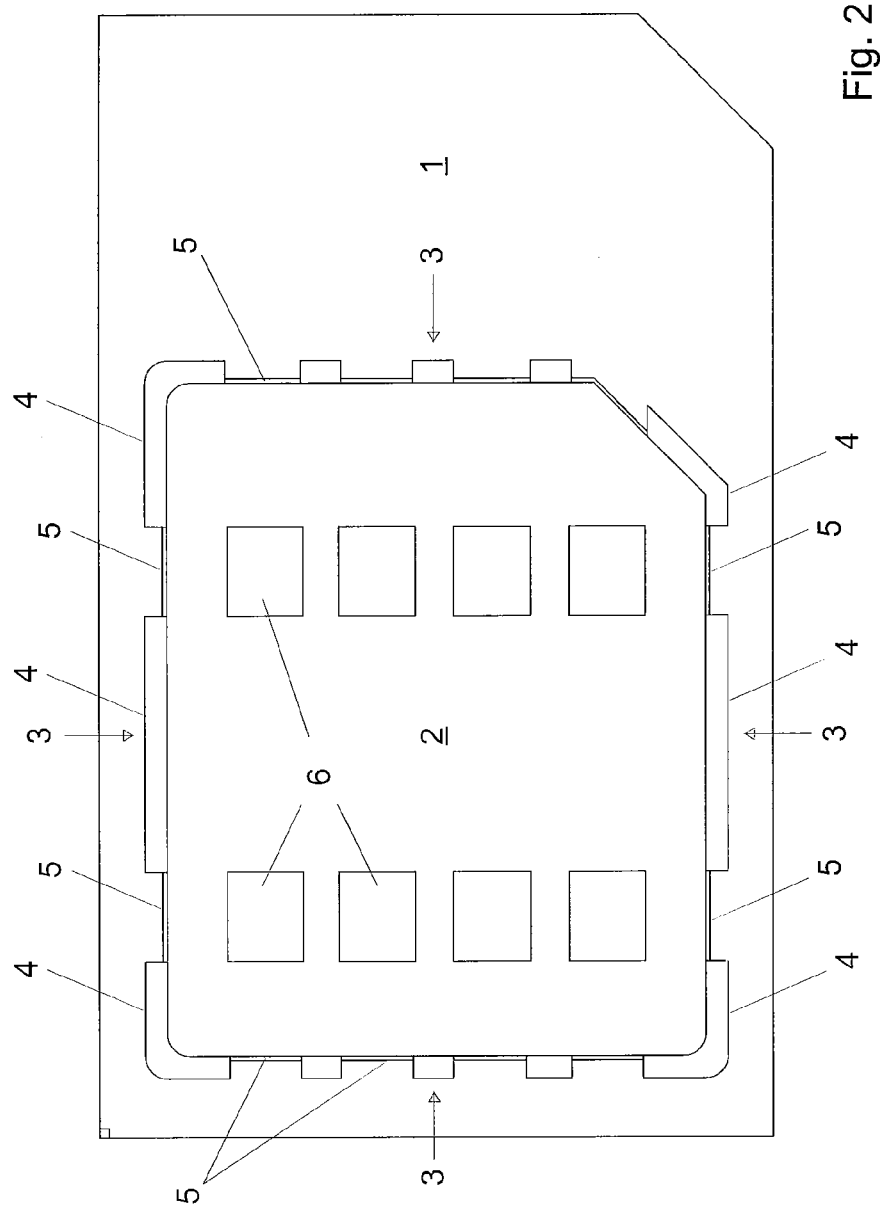

The invention will be described in more detail on the basis of the attached figures, which show:

FIG. 1 a view of a SIM card according to a first embodiment of the invention; and FIG. 2 a view of a SIM card according to a second embodiment of the invention.

WAYS OF EXECUTING THE INVENTION

The inventive SIM card 1 according to a first embodiment of the invention is represented in FIG. 1. A SIM card in plug-in format 1 is shown with an integrated SIM card 2 in mini format that has electrical contacts 6 for the electrical contact with a mobile device. The contacts 6 are the area where the contacts of the mobile device can touch the SIM card. The SIM card in plug-in format 1 is separated from the integrated SIM card in mini format 2 by punched cutouts 4 and connected on both sides of the SIM card with lines engraved as predetermined break points 5. The SIM card in mini format 2 has four lateral edges 3 on which the cutouts 4 and the lines engraved on both sides 5 are provided. The user can either break out the SIM card in plug-in format 1 or the SIM card in mini format 2, as needed, using the existing predetermined break points 5.

In practice, the SIM card in plug-in format 1 with integrated SIM card 2 is currently used. The SIM card is either inserted sideways into the mobile device or pressed into the mobile device from above. When sliding it in, a direction of insertion perpendicular to the edges 3 is used.

The inventive SIM card 1 according to a second embodiment of the invention is represented in FIG. 2. The electrical contacts of the mini SIM card 2 in this embodiment are aligned in relation to the lines 5 engraved on one or preferably both sides. In this context, it must be noted that this alignment occurs generally in the direction of insertion. The engraved line 5 in this embodiment is shorter and replaced at the distance between each individual contact with a small cutout 4, so that the mini SIM card 2 can be separated more easily.

According to the present invention, the punched cutout 4 of the mini SIM card 2 is cut out around the places where the electrical contacts 6 of the mobile device can slide over the SIM card. Thanks to the present invention, it is possible to insert the SIM card into the slot of the mobile device without the contacts of the mobile device being able to slide over the cutouts 4 and the electrical contacts of the mobile device are not damaged or even torn.

According to the embodiment of FIG. 1, only the four corners are provided with a cutout 4. Between the cutouts 4, lines 5 engraved on one or preferably both sides are provided. According to the embodiment of FIG. 1, lines 5 engraved on one or preferably both sides on opposite lateral edges 3 of the mini SIM card 2 can be provided. The projection of the contact field over the four edges is thus free from punched cutouts 4, so that the SIM card in mini format can be inserted into the slot of a mobile device perpendicularly to one of the edges without burrs on a cutout 4 being able to drive over the electric contacts of the mobile device in the process.

It is however not absolutely necessary for the cutouts 4 to be exactly aligned with the electrical contacts 6. On the contrary, the cutouts 4 can also be slightly larger as long as the electrical contacts 6 of the mobile device are not damaged by a possible burr. Generally, the electrical contacts 6 of the mobile device are in this case smaller than the larger electrical contacts of the SIM card.

In both embodiments, at each edge 3 of the mini SIM card 2 an engraved line 5 is provided only along the straight section opposite the contacts 6, wherein this line 3 in the embodiment of FIG. 1 is unbroken and in the embodiment of FIG. 2 is broken. The separation line around the mini SIM card 2 can however also contain additional sections that are marked by an engraved line 3 rather than a cutout 4, including sections that are not provided adjacent to the contact field 6, for example an engraved line 5 around the corners or in the vicinity of the corners of the separation line between the mini SIM card 2 and the plug-in SIM card 1.

The SIM card in plug-in format can itself be part of a larger SIM card, not represented, in credit card format as data carrier (not represented) and be surrounded by this larger card through a cutout with connection points, wherein these connection points can also be separated by the user.

The invention also relates to a method for producing such a SIM card 1 with the corresponding method steps. In this connection, a mini SIM card 2 is first produced within a plug-in card, wherein the mini SIM card is surrounded by a punched cutout 4 and is connected with the rest of the plug-in SIM card 1 only through a few predetermined break points 5, wherein the cutout 4 and the connection points 5 are arranged in such a way that the mini SIM card 2 can be separated from the rest of the plug-in card 1 by pressing. In this connection, according to the invention the cutout 4 is cut out at the edges 3 around the mini SIM card 2 at the points at which the electrical contacts of the mobile device can slide over when the SIM card is inserted into the mobile device. In addition, the material between the cutouts 4 around on both sides of the SIM card is engraved.

The present invention also relates to a mobile device into which an inventive SIM card is inserted.

LIST OF REFERENCE SIGNS

1 SIM card in plug-in format
2 SIM card in mini format
3 edge
4 punched cutouts
5 lines engraved on both sides/predetermined break point
6 electrical contacts of the SIM card

What is claimed:

1. A SIM card, comprising:
   an integrated SIM card, wherein:
      said integrated SIM card is smaller than said SIM card;
      said SIM card comprises a plurality of punched cutouts adjacent to said integrated SIM card;
      said plurality of punched cutouts are arranged such that said integrated SIM card can be detached from said SIM card; and
      each one of said plurality of punched cutouts lines up with at least one electrical contact of said integrated SIM card, and a width of each one of said plurality of punched cutouts corresponds to at least one dimension of said at least one electrical contact of said integrated SIM card.

2. The SIM card of claim 1, wherein said plurality of punched cutouts is cut out based on a direction of insertion of said integrated SIM card.

3. The SIM card of claim 1, wherein said plurality of punched cutouts is cut out such that at least one electrical contact of a mobile device slides over non-punched sections when said integrated SIM card is inserted into a mobile device.

4. The SIM card of claim 1, wherein said SIM card comprises engraved lines arranged based on said plurality of punched cutouts.

5. The SIM card of claim 4, wherein said engraved lines are interrupted by said plurality of punched cutouts.

6. The SIM card of claim 4, wherein said engraved lines are engraved on one side or on both sides of edges around said integrated SIM card.

7. The SIM card of claim 4, wherein said at least one electrical contact of said integrated SIM card is aligned in relation to said engraved lines.

8. The SIM card of claim 7, wherein said at least one electrical contact of said integrated SIM card is aligned in relation to said engraved lines based on a direction of insertion of said integrated SIM card.

9. The SIM card of claim 1, wherein at each edge of a dividing line around said integrated SIM card, an engraved line is provided, and one or more sections of said engraved line are separated from one another by one or more of said plurality of punched cutouts.

10. The SIM card of claim 9, wherein said engraved line at each edge is arranged based on said at least one electrical contact.

11. A method, comprising:
    manufacturing a SIM card with an integrated SIM card, wherein:
       said integrated SIM card is smaller than said SIM card;
       said SIM card comprises a plurality of punched cutouts adjacent to said integrated SIM card;

said plurality of punched cutouts are arranged such that said integrated SIM card can be detached from said SIM card; and each one of said plurality of punched cutouts lines up with at least one electrical contact of said integrated SIM card, and a width of each one of said plurality of punched cutouts corresponds to at least one dimension of said at least one electrical contact of said integrated SIM card.

12. The method of claim 11, wherein said plurality of punched cutouts is cut out based on a direction of insertion of said integrated SIM card.

13. The method of claim 11, wherein said plurality of punched cutouts is cut out such that at least one electrical contact of a mobile device slides over non-punched sections when said integrated SIM card is inserted into a mobile device.

14. The method of claim 11, wherein said SIM card comprises engraved lines arranged based on said plurality of punched cutouts.

15. The method of claim 14, wherein said engraved lines are interrupted by said plurality of punched cutouts.

16. The method of claim 14, wherein said engraved lines are engraved on one side or on both sides of edges around said integrated SIM card.

17. The method of claim 14, wherein said at least one electrical contact of said integrated SIM card is aligned in relation to said engraved lines.

18. The method of claim 17, wherein said at least one electrical contact of said integrated SIM card is aligned in relation to said engraved lines based on a direction of insertion of said integrated SIM card.

19. The method of claim 11, wherein at each edge of a dividing line around said integrated SIM card, an engraved line is provided, and one or more sections of said engraved line are separated from one another by one or more of said plurality of punched cutouts.

20. The method of claim 19, wherein said engraved line at each edge is arranged based on said at least one electrical contact.

* * * * *